(12) United States Patent
Sirotkin et al.

(10) Patent No.: US 8,862,176 B2
(45) Date of Patent: Oct. 14, 2014

(54) TECHNIQUES FOR MITIGATING INTERFERENCE ASSOCIATED WITH DOWNLINK TRANSMISSIONS FROM A BASE STATION

(75) Inventors: Alexander Sirotkin, Petach Tikva (IL); Alexei Davydov, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 290 days.

(21) Appl. No.: 13/531,717

(22) Filed: Jun. 25, 2012

(65) Prior Publication Data
US 2013/0115999 A1 May 9, 2013

Related U.S. Application Data

(60) Provisional application No. 61/556,109, filed on Nov. 4, 2011, provisional application No. 61/589,774, filed on Jan. 23, 2012.

(51) Int. Cl.
*H04B 7/00* (2006.01)
*H04W 52/14* (2009.01)
*H04W 52/40* (2009.01)
*H04W 52/24* (2009.01)
*H04B 7/02* (2006.01)
*H04B 7/06* (2006.01)

(52) U.S. Cl.
CPC ............ *H04B 7/0617* (2013.01); *H04B 7/024* (2013.01); *H04W 52/143* (2013.01); *H04W 52/40* (2013.01); *H04B 7/0632* (2013.01); *H04B 7/0639* (2013.01); *H04W 52/243* (2013.01)
USPC ....... 455/522; 455/63.1; 455/552.1; 455/561; 370/328

(58) Field of Classification Search
USPC .......... 455/435.1, 435.2, 450, 517, 522, 524, 455/525, 550.1, 552.1, 561, 63.1; 370/328
See application file for complete search history.

(56) References Cited

U.S. PATENT DOCUMENTS

| | | | | |
|---|---|---|---|---|
| 8,467,730 | B2* | 6/2013 | Kondo | 455/63.1 |
| 8,503,938 | B2* | 8/2013 | Laroia et al. | 455/63.1 |
| 8,583,153 | B2* | 11/2013 | Furueda et al. | 455/501 |
| 8,594,049 | B2* | 11/2013 | Ohta | 370/332 |
| 8,725,157 | B2* | 5/2014 | Aqvist et al. | 455/443 |

OTHER PUBLICATIONS

3rd Generation Partnership Project; Technical Specification Group Radio Access Network; Evolved Universal Terrestrial Radio Access Network (E-UTRAN); Architecture description (Release 10), 3GPP TS 36.401 V10.3.0 (Sep. 2011).
"Reply LS to R3-070527/R1-071242 on Backhaul (X2 interface) Delay", 3GPP TSG RAN WG1 Meeting #48b R1-071804, St. Julians, Malta, Mar. 26-30, 2007.

(Continued)

*Primary Examiner* — Nhan Le
(74) *Attorney, Agent, or Firm* — Kacvinsky Daisak Bluni PLLC

(57) ABSTRACT

Examples are disclosed for causing one or more subframes to be transmitted from a base station for a wireless network based on beamforming or transmission power characteristics. In some examples, an interference report may be received at a base station via a backhaul communication link. The interference report may indicate measured interference from the base station as measured at one or more wireless devices. The base station may transmit subsequent subframes in a manner to mitigate the previously reported interference. Other examples are described and claimed.

32 Claims, 8 Drawing Sheets

(56) References Cited

OTHER PUBLICATIONS

"Coordinated multi-point schemes with centralized and distributed scheduling", 3GPP TSG-RAN WG1 #63bis R1-110251, Dublin, Ireland, Jan. 16-22, 2011.

"CoMP Performance Evaluation under Low-capacity/High-latency Backhaul", 3GPP TSG RAN WG1 Meeting #66 R1-112339, Athens, Greece, Aug. 22-26, 2011.

"Consideration of X2 Backhaul for CoMP", 3GPP TSG RAN WG1 Meeting #66, R1-112340, Athens, Greece, Aug. 22-26, 2011.

"Non-Full Buffer Evaluation Results for CoMP Scenario 3 and 4", 3GPP TSG RAN WG1 Meeting #65, R1-112509, Athens, Greece, May 22-26, 2011.

"Phase 2 evaluation results for HetNet CoMP scenarios", 3GPP TSG-RAN WG1 #66 R1-112544, Aug. 22-26, 2011.

"Design and Performance Evaluation of Coordinated Beamforming", 3GPP TSG RAN WG1 Meeting #66 R1-113214, Oct. 10-14, 2011.

"High-level proposals on DL-CoMP", 3GPP TSG-RAN WG1 #66bis R1-113385, Oct. 10-14, 2011.

"Coordinated Multi-Point Operation for LTE", 3GPP™ Work Item Description.

* cited by examiner

400

- RECEIVE INTERFERENCE REPORT AT A FIRST BASE STATION FROM A SECOND BASE STATION
  *402*

- DETERMINE BEAMFORMING OR TRANSMISSION POWER SETTING CHARACTERISTICS FOR TRANSMITTING SUBFRAME
  *404*

- USE THE INTERFERENCE REPORT TO DETERMINE THE BEAMFORMING OR TRANSMISSION POWER SETTING CHARACTERISTICS
    *406*

- CAUSE THE SUBFRAME TO BE TRANSMITTED FROM THE FIRST BASE STATION BASED ON THE BEAMFORMING OR TRANSMISSION POWER SETTING CHARACTERISTICS
  *408*

- FORWARDING DETERMINED BEAMFORMING AND/OR TRANSMISSION POWER SETTING CHARACTERISTICS TO THE SECOND BASE STATION
  *410*

*FIG. 4*

Storage Medium 600

*Computer Executable Instructions for 400*

*Computer Executable Instructions for 500*

TECHNIQUES FOR MITIGATING INTERFERENCE ASSOCIATED WITH DOWNLINK TRANSMISSIONS FROM A BASE STATION

RELATED CASE

This application claims priority to U.S. Provisional Patent Application No. 61/556,109, filed on Nov. 4, 2011 and United Stations Provisional Patent Application No. 61/589,774, filed on Jan. 23, 2012, the entirety of both applications are hereby incorporated by reference.

BACKGROUND

Coordinated multipoint (CoMP) is an example of a collaborative scheme increasingly being used in wireless networks. CoMP may be implemented to mitigate interference between base stations, improve system spectral efficiency and enhance throughput performance for user equipment (UE) located at the edge of a base station's coverage area. In some examples, base stations for a wireless network may coordinate downlink transmissions to UEs to accomplish at least one of these goals associated with improving a wireless network's performance.

BRIEF DESCRIPTION OF THE DRAWINGS

FIG. 4 illustrates an example of a first logic flow.
FIG. 6 illustrates an example of a storage medium.

DETAILED DESCRIPTION

Figure 1:
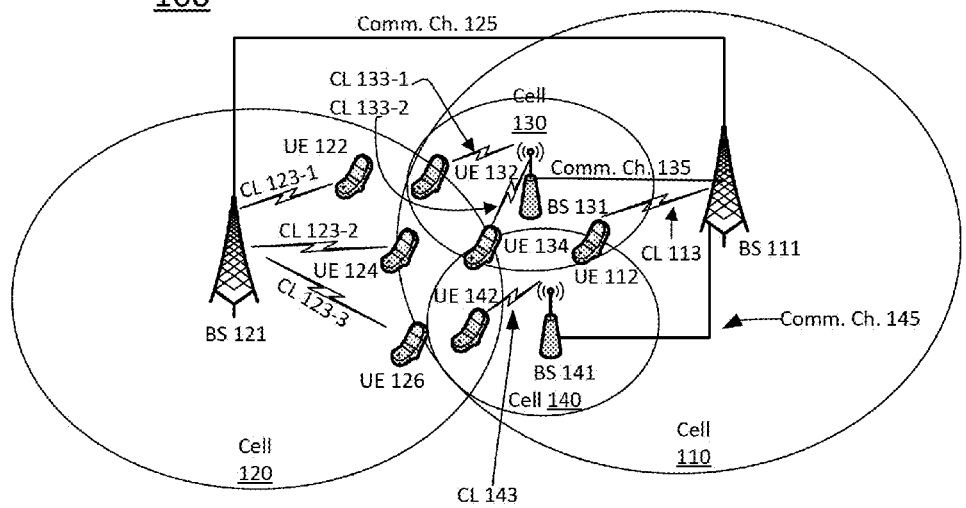
FIG. 1 illustrates an example of a wireless network.

Examples are generally directed to improvements for wireless mobile broadband technologies. Wireless mobile broadband technologies may include any wireless technologies suitable for use with wireless devices or user equipment (UE), such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9 or 10 of LTE/System Architecture Evolution (SAE), and so forth. The examples are not limited in this context.

By way of example and not limitation, various examples may be described with specific reference to various 3GPP LTE and LTE ADV standards, such as the 3GPP LTE Evolved UMTS Terrestrial Radio Access Network (E-UTRAN), Universal Terrestrial Radio Access (E-UTRA) and LTE ADV Radio Technology 36 Series of Technical Specifications (collectively "3GPP LTE specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 standards"), and any drafts, revisions or variants of the 3GPP LTE specifications and the IEEE 802.16 standards. Although some embodiments may be described as a 3GPP LTE specifications or IEEE 802.16 standards system by way of example and not limitation, it may be appreciated that other types of communications system may be implemented as various other types of mobile broadband communications systems and standards. The examples are not limited in this context As contemplated in the present disclosure, coordinated multipoint (CoMP) may be implemented by base stations of a wireless network to possibly mitigate interference, improve system spectral efficiency and enhance throughput performance for user equipment (UE) located at the edge of a given base station's coverage area. Some CoMP schemes assume use of remote radio heads or entities (RRH) that have a fast, proprietary interface between the RRH and a base station such as an evolved Node B (eNB) base station for a Wireless LTE or LTE-A network. These CoMP schemes further assumed that a single eNB serves multiple cells through the deployment of RRHs that together implement what is effectively an intra-eNb CoMP scheme.

A fast proprietary interface between RRHs and an eNB may allow an intra-eNB CoMP scheme to meet latency and throughput requirements for an effective CoMP scheme. However, since a proprietary interface is not standardized, operators may be forced to use equipment from the same vender. Another disadvantage of an intra-eNB CoMP scheme may be that this type of CoMP scheme may be limited to implementations in areas covered by RRHs connected to the same eNB. Adjacent cells served by different eNBs (possibly from different venders) may not be able to fully utilize the benefits of a CoMP scheme. As a result, the adjacent cells having UEs located at the edge of a given eNB's coverage area may not be able to implement a CoMP scheme that mitigates interference, improves system spectral efficiency and enhances throughput performance.

In some examples, techniques are implemented for mitigating interference associated with downlink transmissions from a base station. For these examples, an interference report may be received at a first base station for a wireless network. The interference report may be received from a second base station for the wireless network via a backhaul communication link. The interference report may include information based on measured interference at one or more wireless devices coupled to the second base station. The measured interference may be associated with downlink transmissions from the first base station. Also, for these examples, at least one of a beamforming characteristic or a transmission power setting characteristic for one or more subframes to be transmitted from the first base station may be determined based, at least in part, on the interference information included in the received interference report. The one or more subframes may then be caused to be transmitted from the first base station based on at least one of the beamforming characteristic or the transmission power setting characteristic.

FIG. 1 illustrates an example of a wireless network 100. In some examples, as shown in FIG. 1, wireless network 100 includes cells 110 and 120. Cell 110 is shown in FIG. 1 as also including a cell 130 and a cell 140. Also, as shown in FIG. 1, cells 110, 120, 130 and 140 may each include a base station (BS) 111, a BS 121, a BS 131 and a BS 141, respectively. According to some examples, cells 110 and 120 may represent macrocells for wireless network 100 and cells 130 and 140 may represent microcells or picocells included within cell 110. As shown in FIG. 1, BS 111 may be coupled or interconnected with BSs 121, 131 and 141 via backhaul communication channels. These backhaul communication channels are shown in FIG. 1 as a communication channel (Comm. Ch.) 125, a Comm. Ch. 135 and a Comm. Ch. 145.

According to some examples, as shown in FIG. 1, user equipment (UE) 112, 122, 124, 126, 132, 134 or 142 may be located at or near the edge of cells 110, 120, 130 or 140. For example, UE 112 is shown at the edge of cells 130 and 140. Both UEs 122 and 132 are shown at the edge of cells 110, 120 and 130. UEs 124 and 134 are shown at the edge of all four cells. UEs 126 and 142 are shown at the edge of cells 110, 120 and 140.

In some examples, as shown in FIG. 1, UEs 112, 122, 124, 126, 132, 134 and 142 may be communicatively coupled to a base station via separate communication links (CLs). For example, UE 112 may couple to BS 111 via CL 113 and UEs 122, 124 and 126 may couple to BS 121 via CLs 123-1, 123-2 and 123-3, respectively. Also, UEs 132 and 134 may couple to BS 131 via CLs 133-1 and 133-2, respectively. Further, UE 142 may couple to BS 141 via CL 143.

According to some examples, BS 121 may transmit signals through one or more signal beams in order to communicatively couple with UEs 122, 124 or 126. For these examples, UEs 132, 134 or 142 may experience at least some interference caused by BS 121's transmission signals to UEs 122, 124 or 126. In some examples, due to UEs 132, 134 or 142 being at the edge of cells served by BS 131 and 141, the interference from BS 121 may be severe enough to disrupt or unacceptably degrade the CLs established between UEs 132, 134 or 142 and BSs 131 or 141.

In some examples, UEs 132, 134 or 142 may include logic and/or features to measure the interference from BS 121's transmissions to UEs 122, 124 or 126. For example, UE 132 may measure interference associated with BS 121's transmissions to UE 122 via CL 123-1. UE 134 may measure interference associated with BS 121's transmissions to UE 124 via CL 123-2. Also, UE 142 may measure interference associated with BS 121's transmissions to UE 126 via CL 123-3. For these examples, UEs 132, 134 or 142 may separately transmit information associated with measured interference to their respective base stations.

According to some examples, BS 131 and/or BS 141 may include logic and/or features arranged to receive the interference information from UEs 132, 134 or 142 and may forward the information to BS 111 via Comm. Ch. 135 and/or Comm. Ch. 145. For these examples, BS 111 may include logic and/or features arranged to gather or compile the interference information that originated form UEs 132, 132 or 142 and generate an interference report. The interference report, for example, may be used as part of a CoMP scheme implemented between at least BS 111 and BS 121 to mitigate interference measured at UEs 132, 134 or 142 that was associated with transmissions by BS 121 to UEs 122, 124 or 126. The CoMP scheme may include coordinating downlink transmission of one or more subframes from BS 121 with BS 111 in order to mitigate the interference possibly caused by BS 121's transmissions to UEs 122, 124 or 126.

In some examples, BS 121 may include logic and/or features arranged to receive the interference report generated by BS 111. For these examples, BS 111 may send or forward the interference report via a backhaul communication channel such as Comm. Ch. 125 coupled between BSs 111 and 121. BS 121 may also include logic and/or features arranged to determine at least one of a beamforming characteristic or a transmission power setting characteristic for one or more subframes to be transmitted from BS 121 (e.g., to UEs 122, 124 or 126) based on the interference information included in the received interference report. BS 121 may also include logic and/or features arranged to cause the one or more subframes to be transmitted based on the determined beamforming characteristic and/or the determined transmission power setting characteristic.

According to some examples, as described more below, the determined beamforming characteristics may include a per physical resource block (PRB) precoding matrix indicator (PMI) settings for the one or more subframes to be transmitted from BS 121. For example, BS 121 may include logic and/or features arranged to allocate PRBs and direct signal beams associated with CLs 123-1, 123-2 or 123-3 based on the per PRB PMI setting. Also, the determined transmission power setting characteristic, as described more below, may include PRB power settings for the one or more subframes to be transmitted from BS 121. For example, BS 121 may include logic and/or features arranged to adjust PRB power settings for downlink transmission signals associated with CLs 123-1, 123-2 or 123-3. The adjusted PRB power settings may be set for extended period of time or until BS 121 updates the determined transmission power setting characteristic (e.g., responsive to receiving a new interference report).

In some examples, BS 121 may include logic and/or features arranged to forward or send determined beamforming and/or transmission power setting characteristics to BS 111 via Comm. Ch. 125. For these examples, forwarding the determined beamforming and/or transmission power setting characteristics may enable further coordination between BS 111 and 121 for the transmission of the one or more subframes from BS 121. For example, BS 111 may include logic and/or features configured to receive the determined beamforming and/or transmission power setting characteristics associated with CL 123-1 from BS 121. BS 111 may then forward the determined beamforming and/or transmission power setting characteristics associated with CL 123-1 to the BS 131. As mentioned above, BS 131 receives interference information from UE 132 that indicated interference possibly caused by downlink transmissions from BS 121 via CL 123-1 to UE 122. BS 131 may then relay the determined beamforming and/or transmission power setting characteristics associated with CL 123-1 to UE 132 to indicate mitigating actions taken by BS 121 to reduce or eliminate the interference. According to some examples, UE 132 may then determine at least a channel quality indicator (CQI) for CL 133-1 based on these characteristics in order to report back to BS 131 a qualitative measure of CL 133-1's ability to support various data loads or throughputs transmitted from BS 131 given the indicated mitigating actions by BS 121.

According to some examples, UEs 132, 134 or UE 142 may periodically measure possible interference associated with BS 121's downlink transmissions to UEs such as UEs 122, 124, 126 or any additional UEs serviced by BS 121. Interference information associated with these periodic measurements may be forwarded from base stations coupled to measuring UEs as mentioned above and BS 111 may generate subsequent interference reports. BS 111 may forward or send the subsequent interference reports to BS 121 as mentioned above. BS 121 may then determine updated beamforming and/or transmission power setting characteristics based on the subsequent interference reports. BS 121 may then cause one or more subframes to be transmitted to UEs 122 124 or 126 based on the updated beamforming and/or transmission power setting characteristics.

In some examples, BS 131 and/or BS 141 may be arranged to serve picocells or microcells located within a macrocell served by BS 111. For example, BS 131 may serve cell 130 and BS 141 may serve cell 140. As shown in FIG. 1 both cell 130 and cell 140 are located within cell 110. For these examples, BS 131 and/or BS 141 may receive interference information from UEs 132, 134 or 142 and may forward the interference information to BS 111 via Comm. Ch. 135 and/or Comm. Ch. 145. In some examples, Comm. Ch. 135 and Comm. Ch. 145 may be high capacity low latency proprietary communication channels capable of coupling to BS 111 but not capable of coupling to BS 121. Responsive to receipt of the interference information, BS 111 may then compile an interference report as mentioned above. A CoMP scheme may then be implemented between BS 111 and BS 121 in order to mitigate the interference associated with BS 121's downlink transmissions as measured by UEs coupled to BSs 131 and/or BSs 141. Since cells 130 and 140 are somewhat clustered near the edge of cell 120, this type of CoMP scheme may be referred to as a CoMP cluster scheme.

According to some examples, transmission power setting characteristics may be determined while implementing a CoMP cluster scheme. For these examples, downlink transmission signals from BS 121 may be significantly more powerful at or near the edge of cell 120 compared to downlink transmission signals from BS 131 at the edge of cell 130 or from BS 141 at the edge of cell 140. The determined transmission power setting characteristics may indicate to BS 121 that this disparity in downlink transmission power at the cell edges may be a significant cause of the interference measured by UEs 132, 134 or 142. BS 121 may adjust PRB power settings associated with transmissions to UEs 122, 124 or 126 to possibly reduce the disparity in transmission power in order to mitigate interference caused by the disparity. Alternatively and/or in addition to adjusting PRB power settings, BS 121 may also implement one or more almost blank subframe (ABS) patterns or subframes with reduced power to mitigate interference.

In some examples, downlink transmission from BS 111 may also be a source of interference as observed or measured by UEs 132, 134 or 142. For example, BS 111 may transmit signals through one or more signal beams in order to communicatively couple with UE 112 via CL 113. UE 134, in one example, may experience at least some interference caused by BS 111's downlink transmission signals to UE 112. Due to UE 134's location at the edge of cell 130, the interference from BS 111 may be severe enough to disrupt or unacceptably degrade CL 133-2 between UE 134 and BS 131.

According to some examples, UE 134 may measure the interference from BS 111's transmissions to UE 112 and transmit information associated with the measured interference to BS 130. In contrast to the technique mentioned above, rather than forwarding the interference information to BS 111, BS 131 may include logic and/or features arranged to both receive the interference information and generate an interference report. The interference report generated by BS 131 may be used as part of a CoMP scheme implemented between at least BS 131 and BS 111 to mitigate the interference measured at UE 134 that was associated with downlink transmissions by BS 111 to UE 112. The CoMP scheme may include coordinating transmission of one or more subframes from BS 111 with BS 131 in order to mitigate the interference possibly caused by BS 111's downlink transmissions to UE 112.

In some examples, BS 111 may include logic and/or features arranged to receive the interference report generated by BS 131. For these examples, BS 131 may send or forward the interference report via a backhaul communication channel such as Comm. Ch. 135 coupled between BSs 111 and 131. BS 111 may also include logic and/or features arranged to determine at least one of a beamforming characteristic or a transmission power setting characteristic for one or more subframes to be transmitted from BS 111 (e.g., to UE 112) based on the interference information included in the received interference report. BS 111 may also include logic and/or features arranged to cause the one or more subframes to be transmitted based on the determined beamforming characteristic and/or the determined transmission power setting characteristic.

In some examples, BS 111 may include logic and/or features arranged to forward or send determined beamforming and/or transmission power setting characteristics to BS 131 via Comm. Ch. 135. For these examples, forwarding the determined beamforming and/or transmission power setting characteristics may enable further coordination between BS 111 and 131 for the transmission of the one or more subframes from BS 111. For example, BS 131 may include logic and/or features configured to receive the determined beamforming and/or transmission power setting characteristics associated with CL 113 from BS 111. BS 131 may then relay the determined beamforming and/or transmission power setting characteristics associated with CL 113 to UE 134 to indicate mitigating actions taken by BS 111 to reduce or eliminate the interference. According to some examples, UE 134 may then determine a CQI for CL 132-2 based on these characteristics in order to report back to BS 131 a qualitative measure of CL 133-2's ability to support various data loads or throughputs transmitted from BS 131 given the indicated mitigating actions taken by BS 111.

According to some examples, UEs 112, 122, 124, 126, 132, 134 or 142 may be any electronic device having wireless capabilities or equipment. For some examples, these UEs may be implemented in a fixed device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

According to some examples, the logic and/or features at BSs 111, 121 131 or 141 may include system equipment, such as network equipment for a communications system or network compliant with one or more 3GPP LTE specifications or standards (e.g., LTE-A). For example, these base stations may be implemented as evolved Node B (eNB) base stations for a Wireless LTE or LTE-A network. Although some examples are described with reference to a base station or eNB, embodiments may utilize any network equipment for a wireless network. The examples are not limited in this context.

In some examples, Comm. Chs. 125, 135 or 145 may be arranged or configured as backhaul communication channels separately including one or more communication links via which base stations may exchange or coordinate information (e.g., to implement CoMP schemes to mitigate interference). These one or more communication links may include various types of wired, wireless or optical communication mediums. For these examples, the communication links may be operated in accordance with one or more applicable communication or networking standards in any version. One such communication or networking standard may include 3GPP LTE-A and Comm. Chs. 125, 135 or 145 may be separately arranged to serve as X2 communication channels. According to some examples, logic and/or features at BS 111, 121, 131 or 141 may include an X2 interface that at least allows for these base stations to exchange information via the X2 communication channel.

Figure 2:
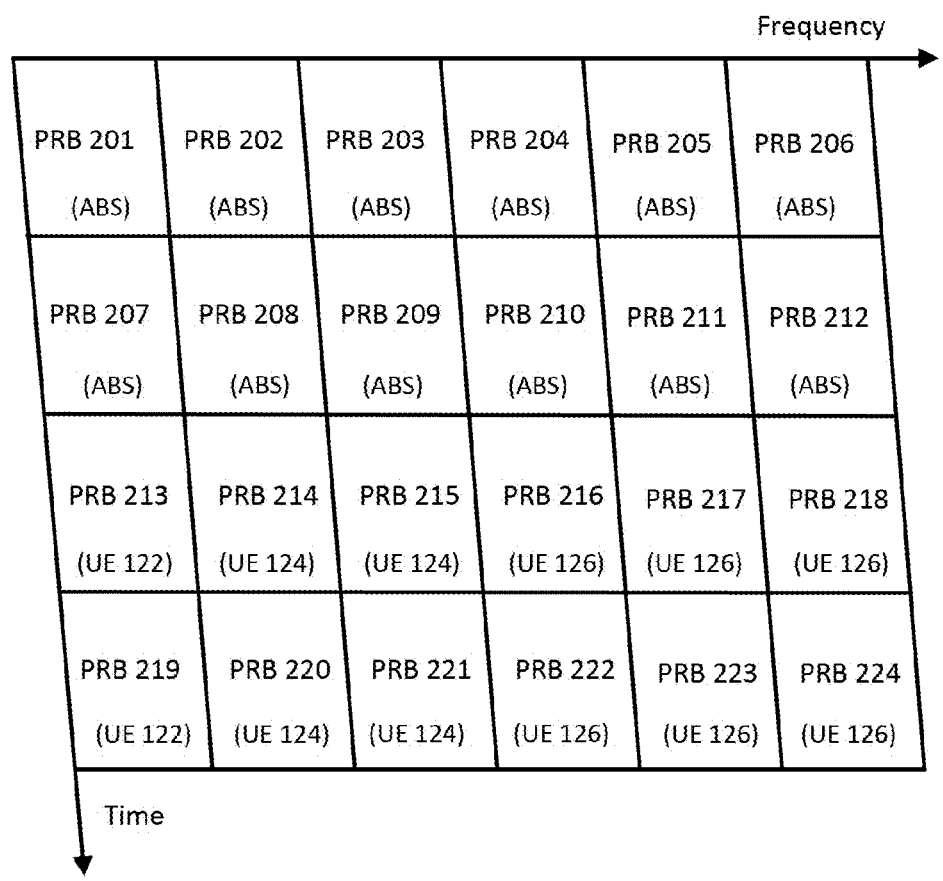
FIG. 2 illustrates an example of a resource map.

FIG. 2 illustrates an example resource map 200. According to some examples, as shown in FIG. 2, resource map 200 may include PRBs 201 to 224. For these examples, each PRB of resource map 200 may represent resources allocated by BS 121 to transmit downlink subframes to UEs 222, 224 or 226. The resources allocated according to resource map 200 may be associated with downlink modulation schemes to include, but is not limited to, quadrature phase shift keying (QPSK), 16 quadrature amplitude modulation (16QAM) or 64QAM. Also, as shown in FIG. 2, each PRB may be allocated along a frequency domain and a time domain. In some examples, each PRB may include, but is not limited to, a total of 12 subcarriers having a subcarrier spacing of 15 kilohertz (kHz) for a total of 180 kHz in the frequency domain. Also, each PRB may include, but is not limited to, a time of 0.5 milliseconds (ms) allocation in the time domain.

In some examples, resource map 200 may have been generated by BS 121 and indicates how BS 121 has allocated physical signal resources to at least some UEs communicatively coupled to BS 121. For example, as shown in FIG. 2, resource map 200 indicates that UEs 122 may be allocated two PRBs, 124 may be allocated four PRBs and UE 126 may be allocated six PRBs. Also, twelve PRBs may be allocated to ABSs.

According to some examples, resource map 200 may have been generated by BS 121 responsive to determining a beamforming characteristic based on one or more interference reports received from BS 111 via Comm. Ch. 125. For these examples, BS 121 may include logic and/or features to further generate a per PRB PMI settings for one or more subframes to be transmitted from BS 121 based on the determined beamforming characteristic. For example, BS 121 may direct signal beams associated with CL 123-1 based on a generated per PRB PMI settings for transmission of subframes to UE 122 via CL 123-1. The allocated frequencies and timing of the transmission may be according to resource map 200.

In some examples, resource map 200 may have been generated by BS 121 responsive to determining a transmission power setting characteristic based on one or more interference reports received from BS 111 via Comm. Ch. 125. For these examples, BS 121 may include logic and/or features to set PRB power settings for one or more subframes to be transmitted from BS 121. For example, BS 121 may adjust the strength of signals sent to UE 124 via CL 123-2 based on the determined transmission power setting characteristic. The determined transmission power setting characteristic may indicate that the timing and frequencies allocated to UE 124 according to resource map 200 may cause less interference if the power was reduced when BS 121 transmitted subframes to UE 124 via CL 123-2.

According to some examples, in addition to or alternative to adjusting PRB power settings, ABSs may be allocated as shown for resource map 200 at PRBs 201 to 212. These blanking subframes may reduce interference associated with frequencies possibly also used by one or more UEs that reported or measured interference from BS 121. The allocation of the ABSs may reduce PRB power settings to near a zero transmission power setting for the 180 kHz band of frequencies associated with PRBs 201 to 212.

Figure 3:
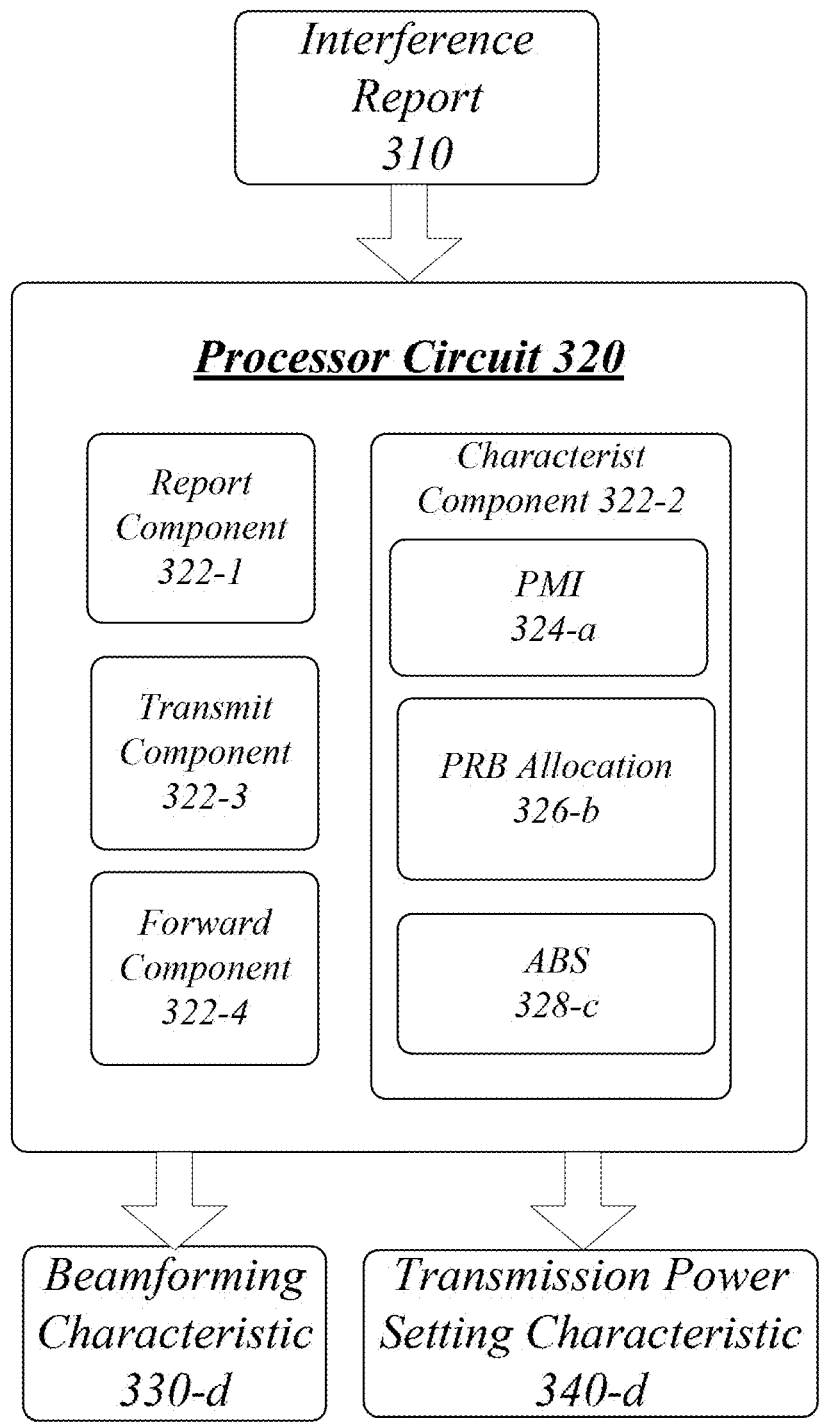
FIG. 3 illustrates an example block diagram for an apparatus.

FIG. 3 illustrates a block diagram for an apparatus 300. Although the apparatus 300 shown in FIG. 3 has a limited number of elements in a certain topology, it may be appreciated that the apparatus 300 may include more or less elements in alternate topologies as desired for a given implementation.

The apparatus 300 may comprise a computer-implemented apparatus 300 having a processor circuit 320 arranged to execute one or more software components 322-*a*. It is worthy to note that "a" and "b" and "c" and similar designators as used herein are intended to be variables representing any positive integer. Thus, for example, if an implementation sets a value for a=5, then a complete set of software components 322-*a* may include components 322-1, 322-2, 322-3, 322-4 and 322-5. The embodiments are not limited in this context.

According to some examples, apparatus 300 may be system equipment (e.g., located at or with BS 111, 121, 131 or 141), such as network equipment for a communications system or network compliant with one or more 3GPP LTE Specifications. For example, apparatus 300 may be implemented as part of a base station or eNB for an LTE and/or LTE-A compliant wireless network. Although some examples are described with reference to a base station or eNB, examples may utilize any network equipment for a communications system or network. The examples are not limited in this context.

In some examples, as shown in FIG. 3, apparatus 300 includes processor circuit 320. Processor circuit 320 may be generally arranged to execute one or more software components 322-*a*. The processing circuit 320 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as processing circuit 320.

According to some examples, apparatus 300 may include a report component 322-1. Report component 322-1 may be arranged for execution by processor circuit 320 to receive interference report 310. For these examples, interference report 310 may be received at a first base station having apparatus 300. Interference report 310 may be received from a second base station and may include information (e.g., PMI information) based on measured interference at one or more wireless devices or UEs coupled to the second base station. Interference report 310 may be received via a backhaul communication channel. For example, apparatus 300 may operate in compliance with the 3GPP LTE-A specification. Report component 322-1 may be arranged to operate an X2 interface to receive interference report 310 via the backhaul communication channel. Also, the backhaul communication channel may be arranged to operate as an X2 communication channel coupled between the first base station and the second base station.

In some examples, apparatus 300 may also include a characteristic component 322-2. Characteristic component 322-2 may be arranged for execution by processor circuit 320 to determine one of a beamforming characteristic or a transmission power setting characteristic for one or more subframes to be transmitted from the first base station (e.g., to one or more UEs coupled to the first base station). For these examples, the beamforming or transmission power setting characteristics may be determined based on interference report 310. According to some examples, the determined beamforming or transmission power setting characteristics may include one or more of PMI 324-a, PRB allocation 326-b or ABS 328-c.

According to some examples, PMI 324-a may include PMI characteristics associated with directing signal beams or beamforming when transmitting downlink subframes from the first base station. PRB allocation 326-b may include PRB allocation characteristics similar to resource map 200 shown in FIG. 2. These PRB allocation characteristics included in PRB allocation 326-b may also be associated with either a PRB PMI settings used for beamforming when transmitting downlink subframes or associated with adjusting transmission power settings when transmitting downlink subframes. ABS 328-c may include ABS characteristics also associated with either a per PRB PMI settings used for beamforming when transmitting downlink subframes or used to adjust transmission power settings when transmitting downlink subframes. For these examples, information associated with PMI 324-a, PRB allocation 326-b or ABS 328-c may be at least temporarily maintained by characteristic component 322-2 (e.g., stored in a data structure such as a lookup table (LUT)).

In some examples, apparatus 300 may also include a transmit component 322-3. Transmit component 322-3 may be arranged for execution by processor circuit 320 to cause one or more subframes to be transmitted from the first base station based on the beamforming or transmission power setting characteristics determined by characteristic component 322-2. For these examples, transmit component 322-3 may utilize information associated with PMI 324-a, PRB allocation 326-b or ABS 328-c (e.g., a per PRB PMI and/or a PRB power settings) to cause the one or more subframes to be transmitted.

According to some examples, transmit component 322-3 may also be arranged to cause the one or more subframes to be transmitted from the first base station based on coordinated beamforming actions to mitigate interference caused by the first base station. The coordinated beamforming actions may include coordination of resource mappings that may form beams with reduced interference or direct beams away from UEs coupled to the second base station.

According to some examples, apparatus 300 may also include a forward component 322-4. Forward component 322-4 may be arranged for execution by processor circuit 320 to forward the determined beamforming characteristic and/or the determined transmission power setting characteristic to the second base station. For these examples, as shown in FIG. 3, these determined characteristics are shown as beamforming characteristic 330-d and transmission power setting characteristic 340-d. Beamforming characteristic 330-d and transmission power setting characteristic 340-d may be forwarded to the second base station via the backhaul communication channel.

In some examples, the second base station may relay at least some of the information included in Beamforming characteristic 330-d and transmission power setting characteristic 340-d to one or more UEs that initially reported the interference. These UEs may then determine or update CQIs for communication links maintained with the second base station based on the relayed information.

Various components of apparatus 300 and a device implementing apparatus 300 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 4 illustrates an example of a logic flow 400. Logic flow 400 may be representative of some or all of the operations executed by one or more logic, features, or devices described herein, such as apparatus 300. More particularly, logic flow 400 may be implemented by report component 322-1, characteristic component 322-2, transmit component 322-3 or forward component 322-4.

In the illustrated example shown in FIG. 4, logic flow 400 may receive an interference report at a first base station from a second base station at block 402. In some examples, report component 322-1 of apparatus 300 (e.g., included in BS 121) may be arranged to receive interference report 310 via a backhaul communication channel (e.g., Comm. Ch. 125). Interference report 310 may include information based on measured interference at one or more wireless devices (e.g., UEs 132, 134 or 142) coupled to the second base station.

In some examples, logic flow 400 at block 404 may determine beamforming or transmission power setting characteristics for transmitting subframes. For these examples, logic flow at block 408 may use the interference report to determine the beamforming or transmission power setting characteristics. According to some examples, characteristic component 322-2 may determine the beamforming or transmission power setting characteristics to include one or more of PMI 324-a, PRB allocation 326-b or ABS 328-c. For example PMI 324-a, PRB allocation 326-b or ABS 328-c may be used for a beamforming characteristic that includes a per PRB PMI settings for transmitting subframes from BS 121 to one or more UEs 122, 124 or 126. Also, PMI 324-a, PRB allocation 326-b or ABS 328-c may be used for a power setting characteristic that includes a PRB power setting for transmitting subframes from BS 121 to one or more UEs 122, 124 or 126.

According to some examples logic flow 400 at block 408 may cause the subframes to be transmitted from the first base station based on the beamforming or transmission power setting characteristics. For these examples, transmit component 322-3 may assist with or cause apparatus 300 to transmit the subframes from BS 121 to UEs 122, 124 or 126 based on the beamforming or transmission power setting characteristics determined by characteristic component 322-2.

According to some examples, logic flow 400 at block 410 may forward determined beamforming and/or transmission power setting characteristics to the second base station. For these examples, forward component 322-4 of apparatus 300 may forward beamforming characteristic 330-d and/or transmission power setting characteristic 340-d to BS 121 via Comm. Ch. 125. Beamforming characteristic 330-d or transmission power setting characteristic 340-d may then be used according to one or more CoMP schemes in order to mitigate interference possibly caused by BS 121's transmissions to UEs 122, 124 or 126.

Figure 5:
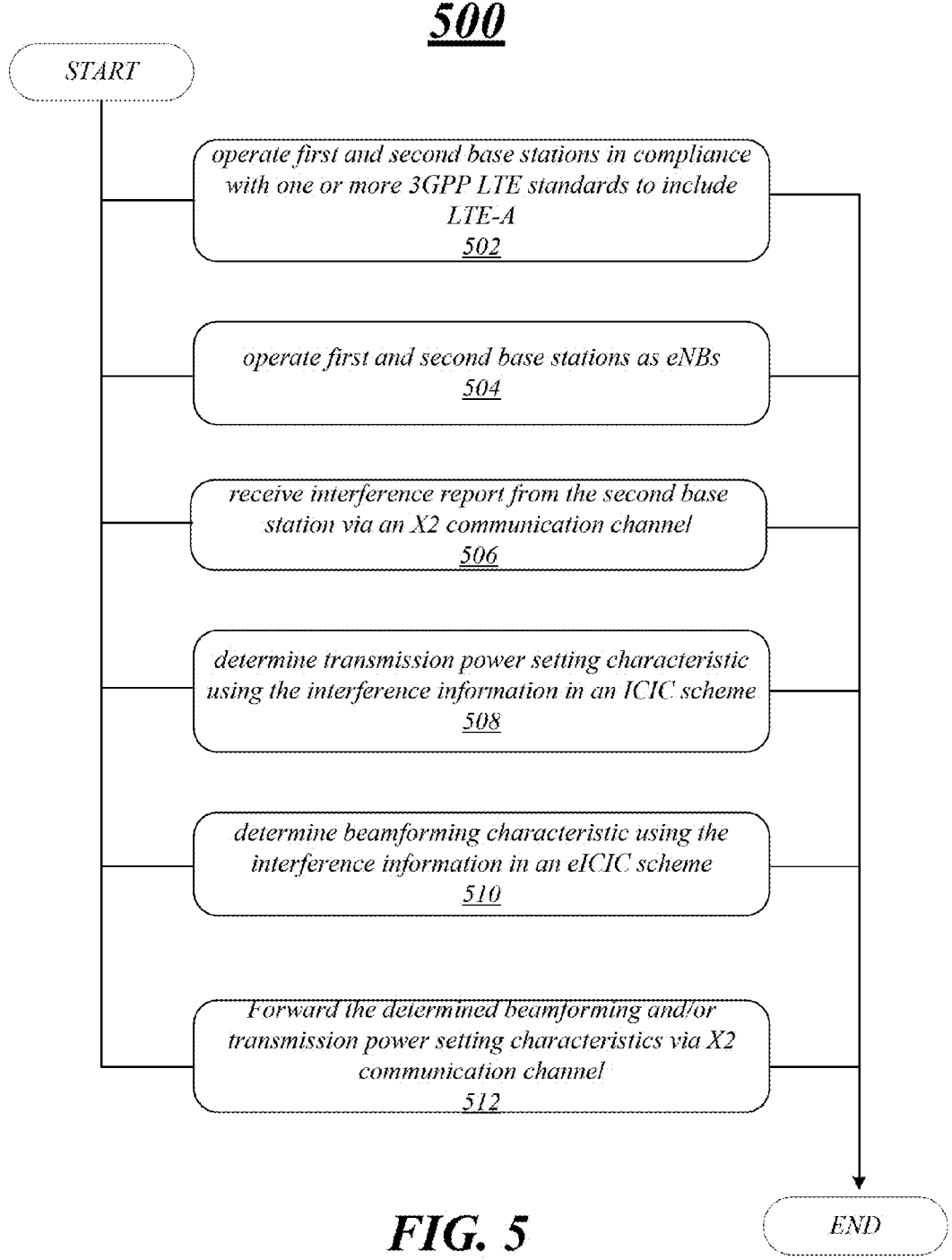
FIG. 5 illustrates an example of a second logic flow.

FIG. 5 illustrates an example of a logic flow 500. Logic flow 500 may be representative of some or all of the operations executed by one or more logic, features, or devices described herein, such as apparatus 300. More particularly, logic flow 500 may be implemented by report component 322-1, characteristic component 322-2, transmit component 322-3 or forward component 322-4.

In the illustrated example shown in FIG. 5, logic flow 500 may operate at least the first and second base stations in compliance with one or more 3GPP LTE standards or specifications to include specifications associated with LTE-A at block 502. For example, the base stations depicted in FIG. 1 such as BSs 111, 121, 131 or 141 may be arranged to operate in compliance with one or more standards associated with LTE-A.

According to some examples, logic flow 500 may operate the first and second base station as eNBs at block 504. For example, BSs 111 and 121 may be arranged to operate as eNBs for wireless network 100. BS 111 may serve as an eNB for cell 110 of wireless network 100 and BS 121 may serve as an eNB for cell 120 of wireless network 100. BSs 130 and 140 may also be arranged to operate as eNBs for wireless network 100 and may serve cells 130 and 140, respectively.

In some examples, logic flow 500 may receive an interference report from the second base station via an X2 communication channel at block 506. For example, components of apparatus 300 at BS 121 such as report component 322-1 may be arranged to receive interference report 310 via the X2 Comm. Ch. 125. Interference report 310 may include PMI information to indicate averaged dominant interference direction(s) from interference possibly caused by BS 121 during downlink transmissions. According to some examples, report component 322-1 may receive interference report 310 through an X2AP RESOURCE STATUS UPDATE message sent or forwarded from BS 111 via X2 Comm. Ch. 125. This disclosure is not limited to an X2AP RESOURSE STATUS UPDATE message to relay information included in an interference report.

According to some examples, logic flow 500 may determine a transmission power setting characteristic using the received interference information as part of implementing an inter-cell interference coordination (ICIC) scheme at block 508. For these examples, BSs 111, 121, 131 or 141 may implement the ICIC scheme to coordinate interference mitigation on a semi-static basis. For example, BS 121 may be arranged to at least semi-statically coordinate with BS 111 reduction of the power of at least some subfrequencies in a frequency domain for transmission of subframes to UEs 122, 124 or 126. The reduced power may mitigate interference caused by BS 121's downlink transmissions as measured by UEs located at or near the edge of cell 120 such as UES 132, 134 or 142.

In some examples, logic flow 500 may determine a beamforming characteristic using the received interference information as part of implementing an enhanced ICIC (eICIC) scheme at block 510. For these examples, a resource map similar to resource map 200 shown in FIG. 2 may be generated by BS 121 to allocate resources in both a frequency domain and a time domain to mitigate interference caused by BS 121's transmissions. For example, BS 121 may be arranged to coordinate resource mappings with BSs 111, 131 or 141 on a semi-static basis as part of implementing the eICIC scheme. The coordination of resource mappings may include BS 121 using blanking subframes such as ABSs, reduced power subframes and/or directing beams away from UEs serviced by other base stations responsive to or based on the resource mappings of the other base stations.

In some example, alternatively or in addition to implementing an eICIC scheme, coordinated beamforming actions may be taken to mitigate interference based on the received interference information. The coordinated beamforming actions may include BSs 111, 131 or 141 coordinating with BS 121 to reduce or mitigate interference caused to BS 121's transmissions to UEs 122, 124 or 126. The beamforming actions may include coordination of resource mappings that may form beams with reduced interference or direct beams away from UEs 122, 124 or 126 according to the coordinated resource mappings.

According to some examples, logic flow 500 may forward the determined beamforming and/or transmission power setting characteristics via an X2 communication channel at block 512. For these examples, forward component 322-4 may forward beamforming characteristic 330-d and/or transmission power setting characteristic 340-d to BS 111 via the X2 Comm. Ch. 125. BS 111 may then relay beamforming characteristic 330-d and/or transmission power setting characteristic 340-d to BS 131 or BS 141 via X2 Comm. Ch. 135 or X2 Comm. Ch. 145. As a result of forwarding and relaying characteristic information via the various X2 communication channels of wireless network 100, BS 121 may use these X2 communication channels to at least semi-statically coordinate implementation of ICIC, eICIC or beamforming coordination schemes as mentioned above.

In some examples, an X2AP LOAD INFORMATION message may be used to forward or relay information associated with beamforming and/or transmission power setting characteristics via X2 communication channels. This disclosure is not limited to an X2AP LOAD INFORMATION message to forward or relay information associated with beamforming and/or transmission power setting characteristics via X2 communication channels.

FIG. 6 illustrates an embodiment of a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement one or more of the logic flows 400 and/or 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
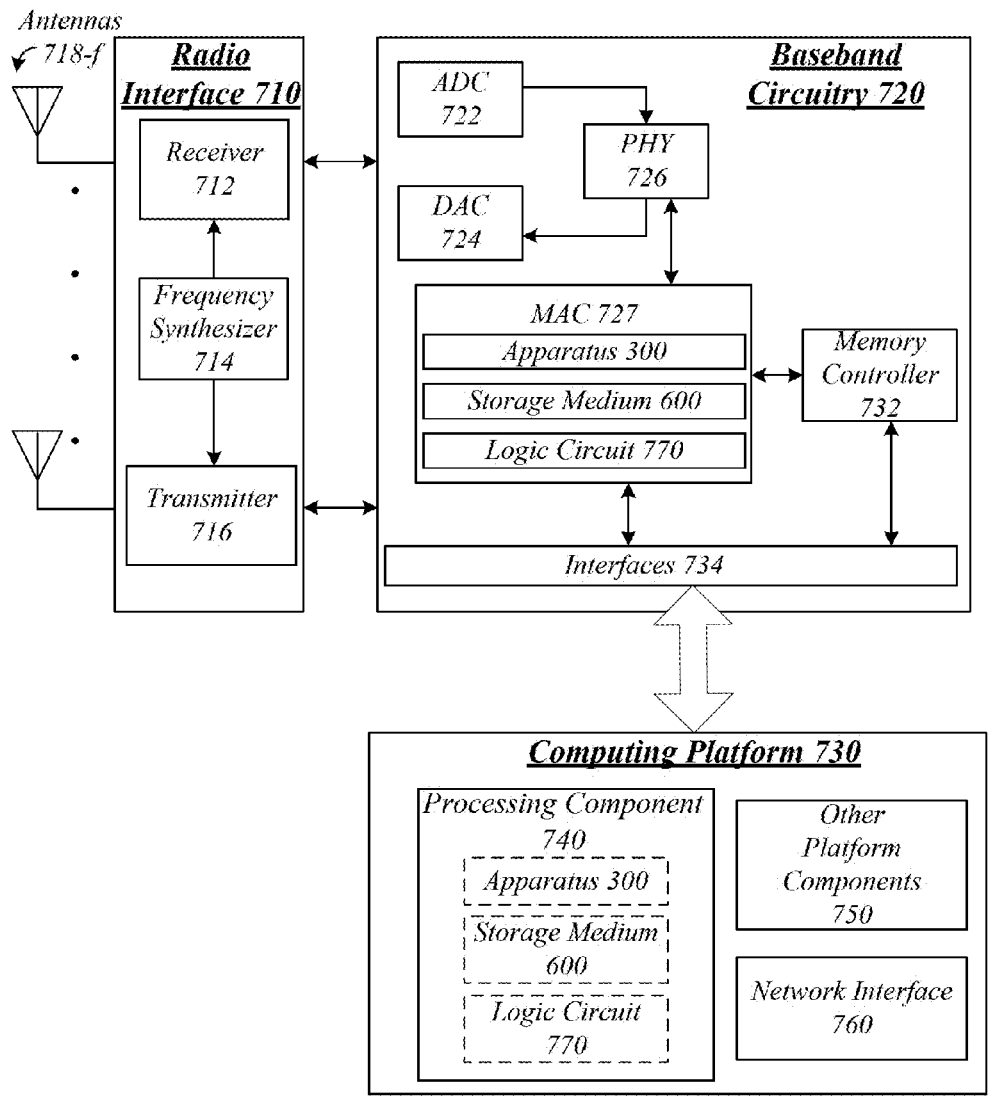
FIG. 7 illustrates an example of a communications architecture.

FIG. 7 illustrates an embodiment of a device 700 for use in a broadband wireless access network. Device 700 may implement, for example, apparatus 300, storage medium 600 and/or a logic circuit 770. The logic circuit 770 may include physical circuits to perform operations described for apparatus 700. As shown in FIG. 7, device 700 may include a radio interface 710, baseband circuitry 720, and computing platform 730, although examples are not limited to this configuration.

The device 700 may implement some or all of the structure and/or operations for the apparatus 300, storage medium 600 and/or logic circuit 770 in a single computing entity, such as entirely within a single device. Alternatively, the device 700 may distribute portions of the structure and/or operations for the apparatus 300, storage medium 600 and/or logic circuit 770 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 710 may include, for example, a receiver 712, a transmitter 716 and/or a frequency synthesizer 714. Radio interface 710 may include bias controls, a crystal oscillator and/or one or more antennas 718-f. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a processing circuit 727 for medium access control (MAC)/data link layer processing. Baseband circuitry 720 may include a memory controller 732 for communicating with MAC processing circuit 727 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames (e.g., containing subframes). Alternatively or in addition, MAC processing circuit 727 may share processing for certain of these functions or perform these processes independent of PHY processing circuit 726. In some embodiments, MAC and PHY processing may be integrated into a single circuit.

Computing platform 730 may provide computing functionality for device 700. As shown, computing platform 730 may include a processing component 740. In addition to, or alternatively of, baseband circuitry 720 of device 700 may execute processing operations or logic for apparatus 300, storage medium 600, and logic circuit 770 using the processing component 730. Processing component 740 (and/or PHY 726 and/or MAC 727) may comprise various hardware elements, software elements, or a combination of both. Examples of hardware elements may include devices, logic devices, components, processors, microprocessors, circuits, processor circuits (e.g., processor circuit 720), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 730 may further include a network interface 760. In some examples, network interface 760 may include logic and/or features to support an X2 interface as described in one or more 3GPP LTE or LTE-A specifications or standards. For these examples, network interface 760 may enable an apparatus 300 located at a base station to communicatively couple to one or more other base stations via an X2 communication channel.

Device 700 may be, for example, user equipment, a computer, a personal computer (PC), a desktop computer, a laptop computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired. In some embodiments, device 700 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 700 may be implemented using single input single output (SISO) architectures. However, certain implementations may include multiple antennas (e.g., antennas 718-*f*) for transmission and/or reception using adaptive antenna techniques for beamforming or spatial division multiple access (SDMA) and/or using multiple input multiple output (MIMO) communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 8:
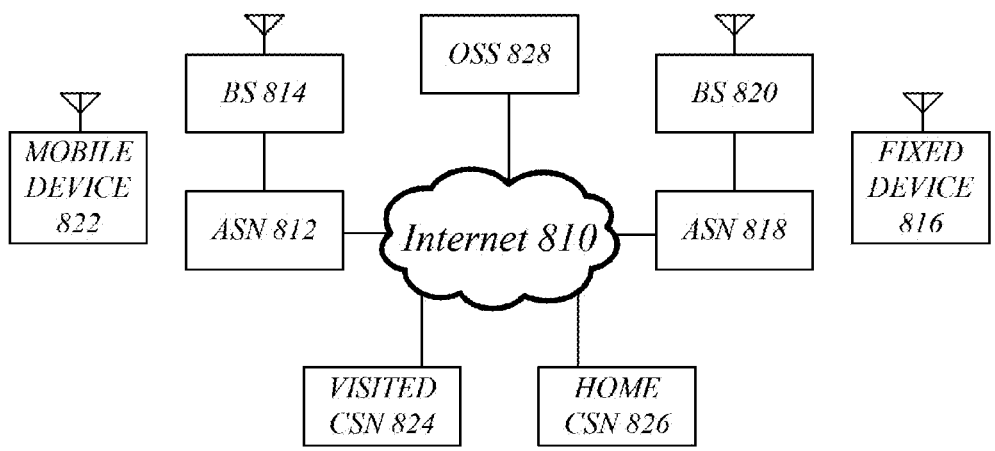
FIG. 8 illustrates an example of a communications system.

FIG. 8 illustrates an embodiment of a broadband wireless access system 800. As shown in FIG. 8, broadband wireless access system 800 may be an internet protocol (IP) type network comprising an internet 810 type network or the like that is capable of supporting mobile wireless access and/or fixed wireless access to internet 810. In one or more embodiments, broadband wireless access system 800 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 800, access service networks (ASN) 814, 818 are capable of coupling with base stations (BS) 814, 820 (or eNBs), respectively, to provide wireless communication between one or more fixed devices 816 and internet 810, or one or more mobile devices 822 and Internet 810. One example of a fixed device 816 and a mobile device 822 is UE 112, with the fixed device 816 comprising a stationary version of UE 112 and the mobile device 822 comprising a mobile version of UE 112. ASN 812 may implement profiles that are capable of defining the mapping of network functions to one or more physical entities on broadband wireless access system 800. Base stations 814, 820 (or eNBs) may comprise radio equipment to provide RF communication with fixed device 816 and mobile device 822, such as described with reference to device 800, and may comprise, for example, the PHY, MAC, RLC or PDCP layer equipment in compliance with a 3GPP LTE Specification or an IEEE 802.16 Standard. Base stations 814, 820 (or eNBs) may further comprise an IP backplane to couple to Internet 810 via ASN 812, 818, respectively, although the scope of the claimed subject matter is not limited in these respects.

Broadband wireless access system 800 may further comprise a visited connectivity service network (CSN) 824 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 824 or home CSN 826, and the scope of the claimed subject matter is not limited in these respects. Visited CSN 824 may be referred to as a visited CSN in the case where visited CSN 824 is not part of the regular service provider of fixed device 816 or mobile device 822, for example where fixed 816 or mobile device 822 is roaming away from their respective home CSN 826, or where broadband wireless access system 800 is part of the regular service provider of fixed device 816 or mobile device 822 but where broadband wireless access system 800 may be in another location or state that is not the main or home location of fixed device 816 or mobile device 822.

Fixed device 816 may be located anywhere within range of one or both base stations 814, 820, such as in or near a home or business to provide home or business customer broadband access to Internet 810 via base stations 814, 820 and ASN 812, 818, respectively, and home CSN 826. It is worthy to note that although fixed device 816 is generally disposed in a stationary location, it may be moved to different locations as needed. Mobile device 822 may be utilized at one or more locations if mobile device 822 is within range of one or both base stations 814, 820, for example.

In accordance with one or more embodiments, operation support system (OSS) 828 may be part of broadband wireless access system 800 to provide management functions for broadband wireless access system 800 and to provide interfaces between functional entities of broadband wireless access system 800. Broadband wireless access system 800 of FIG. 8 is merely one type of wireless network showing a certain number of the components of broadband wireless access system 800, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, computer-implemented methods may include receiving, at a first base station for a wireless network, an interference report from a second base station for the wireless network via a backhaul communication link. The interference report may include information based on measured interference at one or more wireless devices coupled to the second base station. The interference may be associated with downlink transmissions from the first base station. At least one of a beamforming characteristic or a transmission power setting characteristic for one or more subframes to be transmitted from the first base station may be determined based, at least in part, on the interference information included in the received interference report. The one or more subframes may then be caused to be transmitted from the first base station based on at least one of the beamforming characteristic or the transmission power setting characteristic.

In some examples, the computer-implemented methods may also include the determined beamforming characteristic including a per PRB PMI settings for the one or more subframes to be transmitted from the first base station.

In some examples, the computer-implemented methods may also include causing the one or more subframes to be transmitted from the first base station comprises coordinating one or more beamforming actions between the first base station and the second base station in order to reduce or mitigate the interference associated with downlink transmissions from the first base station.

According to some examples, the computer-implemented methods may also include the determined transmission power setting characteristics including a PRB power setting for the one or more subframes to be transmitted from the first base station.

In some examples, the computer-implemented methods may also include forwarding the determined beamforming characteristic and/or the determined transmission power setting characteristic to the second base station via the backhaul communication link. The determined beamforming characteristic and/or the determined transmission power setting characteristic may be forwarded to coordinate transmission of the one or more subframes from the first base station with the second base station to mitigate downlink transmission interference associated with the first base station.

According to some examples, to coordinate transmission includes the second base station capable of being configured to relay the determined beamforming characteristic and/or the determined transmission power setting characteristic to the one or more wireless devices and the one or more wireless devices capable of being configured to determine a channel quality indicator based on the determined beamforming characteristic and/or the determined transmission power setting characteristic and indicate the determined channel quality indicator to the second base station.

In some examples, the computer-implemented methods may also include periodically receiving subsequent interference reports from the second base station via the backhaul communication link. At least one of an updated beamforming characteristic or an updated transmission power setting characteristic may be determined and the one or more subframes may be caused to be transmitted from the first base station based on at least one of the updated beamforming characteristic or the updated transmission power setting characteristic.

According to some examples, the computer-implemented methods may also include the first and the second base stations separately serving first and second macrocells, respectively, and the one or more wireless devices being coupled to the second base station through a third base station serving one of a picocell or microcell for the one or more wireless devices.

In some examples, the computer-implemented methods may also include the first base station serving a macrocell and the second base station serving one of a picocell or microcell, the one or more wireless devices physically located within the service area of both the first and the second base stations.

According to some examples, the computer-implemented methods may also include the first and the second base stations being operated in compliance with one or more 3GPP LTE standards to include LTE-A. The first and the second base stations may be operate as eNBs and the backhaul communication link coupling the eNBs may be an X2 communication channel.

In some examples, the computer-implemented methods may also include determining the transmission power setting characteristics including use of the interference information in an ICIC scheme between the first base station and the second base station.

According to some examples, the computer-implemented methods may also include determining the at least one beamforming characteristic or transmission power setting characteristic including use of the interference information in an eICIC scheme between the first base station and the second base station.

According to some examples, at least one machine readable medium comprising a plurality of instructions that in response to being executed on a computing device cause the computing device to carry out the example computer-implemented methods as mentioned above.

In some examples a communications device may be arranged to perform the example computer-implemented methods as mentioned above.

In some examples an apparatus or device may include means for performing the example computer-implemented methods as mentioned above.

According to some examples, an example first apparatus for a base station may include a processor circuit and a report component arranged for execution by the processor circuit to receive an interference report from a second base station of the wireless network via a backhaul communication link. The interference report may include information based on measured interference at one or more wireless devices coupled to the second base station. The interference may be associated with downlink transmissions from the first base station. The first apparatus may also include a characteristic component arranged for execution by the processor circuit to determine at least one of a beamforming characteristic or a transmission power setting characteristic for one or more subframes to be transmitted from the first base station based, at least in part, on the interference information included in the received interference report. The first apparatus may also include a transmit component arranged for execution by the processor circuit to cause the one or more subframes to be transmitted from the first base station based on at least one of the beamforming characteristic or the transmission power setting characteristic.

In some example, for the example first apparatus, the determined beamforming characteristic including a per PRB PMI settings for the one or more subframes to be transmitted from the first base station.

According to some example, for the example first apparatus the transmit component to cause the one or more subframes to be transmitted from the first base station may include the transmit component also arranged to coordinate one or more beamforming actions between the first base station and the second base station. The actions may be coordinated in order to reduce or mitigate the interference associated with downlink transmissions from the first base station.

In some example, for the example first apparatus, the determined transmission power setting characteristics including a PRB power setting for the one or more subframes to be transmitted from the first base station.

In some examples, the example first apparatus may also include a forwarding component coupled to the processor circuit to forward the determined beamforming characteristic and/or the determined transmission power setting characteristic to the second base station via the backhaul communication link in order for the transmit component to coordinate transmission of the one or more subframes from the first base station with the second base station to mitigate downlink transmission interference associated with the first base station.

In some example, for the example first apparatus, the report component may also be arranged to periodically receive subsequent interference reports from the second base station via the backhaul communication link. The characteristic component may also be arranged to determine at least one of an updated beamforming characteristic or an updated transmission power setting characteristic. The transmit component may also be arranged to cause the one or more subframes to be transmitted from the first base station based on at least one of the updated beamforming characteristic or the updated transmission power setting characteristic.

According to some example, for the example first apparatus, the first and the second base stations separately serving first and second macrocells, respectively, and the one or more wireless devices are coupled to the second base station through a third base station serving one of a picocell or microcell for the one or more wireless devices.

According to some examples for the example first apparatus, the first and second base station may be arranged to operate as eNBs in compliance with one or more or more 3GPP LTE standards to include LTE-A. For these examples, an X2 interface may be coupled to the processor circuit to enable the report component to receive the interference report.

In some examples for the example first apparatus, the characteristic component also arranged to determine the transmission power setting characteristics based on using the interference information in an ICIC scheme between the first base station and the second base station.

According to some examples for the example first apparatus, the characteristic component also arranged to determine the at least one beamforming characteristic or transmission setting characteristic based on an eICIC scheme between the first base station and the second base station.

In some examples for the example first apparatus, a digital display may be coupled to the processor circuit to present a user interface view.

According to some examples, an example second apparatus for a base station may include means for receiving, at a first base station for a wireless network, an interference report from a second base station for the wireless network via a backhaul communication link. The interference report may include information based on measured interference at one or more wireless devices coupled to the second base station. The interference may be associated with downlink transmissions from the first base station. The example second apparatus may also include means for determining at least one of a beamforming characteristic or a transmission power setting characteristic for one or more subframes to be transmitted from the first base station based, at least in part, on the interference information included in the received interference report. The example second apparatus may also include means for causing the one or more subframes to be transmitted from the first base station based on at least one of the beamforming characteristic or the transmission power setting characteristic.

In some examples for the example second apparatus, the determined beamforming characteristic may include a per PRB PMI settings for the one or more subframes to be transmitted from the first base station.

According to some examples for the second example apparatus, the means for causing the one or more subframes to be transmitted from the first base station includes means for coordinating one or more beamforming actions between the first base station and the second base station in order to reduce or mitigate the interference associated with downlink transmissions from the first base station.

According to some examples, the second example apparatus may also include means for forwarding the determined beamforming characteristic and/or the determined transmission power setting characteristic to the second base station via the backhaul communication link to coordinate transmission of the one or more subframes from the first base station with the second base station to mitigate downlink transmission interference associated with the first base station.

In some examples, the second example apparatus may also include means for means for periodically receiving subsequent interference reports from the second base station via the backhaul communication link. Means for determining at least one of an updated beamforming characteristic or an updated transmission power setting characteristic may also be included in the second example apparatus. Means for causing the one or more subframes to be transmitted from the first base station based on at least one of the updated beamforming characteristic or the updated transmission power setting characteristic may also be included in the second example apparatus.

According to some examples for the example second apparatus, the first base station may be serving a macrocell and the second base station may be serving one of a picocell or microcell. The one or more wireless devices may be physically located within the service area of both the first and second base stations.

In some examples, the example second apparatus may also include means for operating the first and the second base stations as eNBs in compliance with one or more or 3GPP LTE standards to include LTE-A. This example second apparatus may also include means for communicating from the first base station to the second base station via an X2 communication channel in order receive the interference report.

According to some examples, the second example apparatus may also include means for determining the transmission power setting characteristics also including means for using the interference information in an ICIC scheme between the first base station and the second base station.

In some examples, the second example apparatus may also include means for means for determining the at least one beamforming characteristic or transmission power setting characteristic also including means for using the interference information in an eICIC scheme between the first base station and the second base station.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, at a first base station for a wireless network, an interference report from a second base station for the wireless network via a backhaul communication link, the interference report including information based on measured interference at one or more wireless devices coupled to the second base station, the interference associated with downlink transmissions from the first base station;
   determining at least one of a beamforming characteristic or a transmission power setting characteristic for one or more subframes to be transmitted from the first base station based, at least in part, on the interference information included in the received interference report; and
   causing the one or more subframes to be transmitted from the first base station based on at least one of the beamforming characteristic or the transmission power setting characteristic.

2. The computer-implemented method of claim 1, comprising the determined beamforming characteristic including a per physical resource block (PRB) precoding matrix indicator (PMI) settings for the one or more subframes to be transmitted from the first base station.

3. The computer-implemented method of claim 1, causing the one or more subframes to be transmitted from the first base station comprises coordinating one or more beamforming actions between the first base station and the second base station in order to reduce or mitigate the interference associated with downlink transmissions from the first base station.

4. The computer-implemented method of claim 1, comprising the determined transmission power setting characteristics including a physical resource block (PRB) power setting for the one or more subframes to be transmitted from the first base station.

5. The computer-implemented method of claim 1, comprising forwarding the determined beamforming characteristic or the determined transmission power setting characteristic to the second base station via the backhaul communication link to coordinate transmission of the one or more subframes from the first base station with the second base station to mitigate downlink transmission interference associated with the first base station.

6. The computer-implemented method of claim 5, the second base station arranged to relay the determined beamforming characteristic or the determined transmission power setting characteristic to the one or more wireless devices and the one or more wireless devices arranged to determine a channel quality indicator based on the determined beamforming characteristic or the determined transmission power setting characteristic and indicate the determined channel quality indicator to the second base station.

7. The computer-implemented method of claim 1, comprising:
   periodically receiving subsequent interference reports from the second base station via the backhaul communication link;
   determining at least one of an updated beamforming characteristic or an updated transmission power setting characteristic; and
   causing the one or more subframes to be transmitted from the first base station based on at least one of the updated beamforming characteristic or the updated transmission power setting characteristic.

8. The computer-implemented method of claim 1, comprising the first and the second base stations separately serving first and second macrocells, respectively, and the one or more wireless devices being coupled to the second base station through a third base station serving one of a picocell or microcell for the one or more wireless devices.

9. The computer-implemented method of claim 1, comprising the first base station serving a macrocell and the second base station serving one of a picocell or microcell, the one or more wireless devices physically located within the service area of both the first and the second base stations.

10. The computer-implemented method of claim 1, comprising the first and the second base stations being operated in compliance with one or more $3^{rd}$ Generation Partnership Project (3GPP) Long Term Evolution (LTE) standards to include LTE-Advanced (LTE-A).

11. The computer-implemented method of claim 10, comprising the first and the second base stations being operate as Evolved Node Bs (eNBs).

12. The computer-implemented method of claim 11, comprising the backhaul communication link coupling the eNBs included in the coordinating set of eNBs being an X2 communication channel.

13. The computer-implemented method of claim 12, comprising determining the transmission power setting characteristics includes using the interference information in an inter-cell interference coordination (ICIC) scheme between the first base station and the second base station.

14. The computer-implemented method of claim 12, comprising determining the at least one beamforming characteristic or transmission power setting characteristic includes using the interference information in an enhanced inter-cell interference coordination (eICIC) scheme between the first base station and the second base station.

15. An apparatus for a first base station of a wireless network comprising:
a processor circuit;
a report component arranged for execution by the processor circuit to receive an interference report from a second base station of the wireless network via a backhaul communication link, the interference report including information based on measured interference at one or more wireless devices coupled to the second base station, the interference associated with downlink transmissions from the first base station;
a characteristic component arranged for execution by the processor circuit to determine at least one of a beamforming characteristic or a transmission power setting characteristic for one or more subframes to be transmitted from the first base station based, at least in part, on the interference information included in the received interference report; and
a transmit component arranged for execution by the processor circuit to cause the one or more subframes to be transmitted from the first base station based on at least one of the beamforming characteristic or the transmission power setting characteristic.

16. The apparatus of claim 15, comprising the determined beamforming characteristic including a per physical resource block (PRB) precoding matrix indicator (PMI) settings for the one or more subframes to be transmitted from the first base station.

17. The apparatus of claim 15, the transmit component to cause the one or more subframes to be transmitted from the first base station comprises the transmit component also arranged to coordinate one or more beamforming actions between the first base station and the second base station in order to reduce or mitigate the interference associated with downlink transmissions from the first base station.

18. The apparatus of claim 15, comprising the determined transmission power setting characteristics including a physical resource block (PRB) power setting for the one or more subframes to be transmitted from the first base station.

19. The apparatus of claim 15, comprising a forwarding component coupled to the processor circuit to forward the determined beamforming characteristic or the determined transmission power setting characteristic to the second base station via the backhaul communication link in order for the transmit component to coordinate transmission of the one or more subframes from the first base station with the second base station to mitigate downlink transmission interference associated with the first base station.

20. The apparatus of claim 15, comprising:
the report component to also be arranged to periodically receive subsequent interference reports from the second base station via the backhaul communication link;
the characteristic component to also be arranged to determine at least one of an updated beamforming characteristic or an updated transmission power setting characteristic; and
the transmit component to also be arranged to cause the one or more subframes to be transmitted from the first base station based on at least one of the updated beamforming characteristic or the updated transmission power setting characteristic.

21. The apparatus of claim 15, comprising the first and the second base stations separately serving first and second macrocells, respectively, and the one or more wireless devices are coupled to the second base station through a third base station serving one of a picocell or microcell for the one or more wireless devices.

22. The apparatus of claim 15, comprising the first and the second base stations arranged to operate as an Evolved Node B (eNB) in compliance with one or more $3^{rd}$ Generation Partnership Project (3GPP) Long Term Evolution (LTE) standards to include LTE-Advanced (LTE-A).

23. The apparatus of claim 22, comprising an X2 interface coupled to the processor circuit to enable the report component to receive the interference report.

24. The apparatus of claim 23, comprising the characteristic component also arranged to determine the transmission power setting characteristics based on using the interference information in an inter-cell interference coordination (ICIC) scheme between the first base station and the second base station.

25. The apparatus of claim 23, comprising the characteristic component also arranged to determine the at least one beamforming characteristic or transmission power setting characteristic based on an enhanced inter-cell interference coordination (eICIC) scheme between the first base station and the second base station.

26. The apparatus of claim 15, comprising a digital display coupled to the processor circuit to present a user interface view.

27. An apparatus comprising:
means for receiving, at a first base station for a wireless network, an interference report from a second base station for the wireless network via a backhaul communication link, the interference report including information based on measured interference at one or more wireless devices coupled to the second base station, the interference associated with downlink transmissions from the first base station;
means for determining at least one of a beamforming characteristic or a transmission power setting characteristic for one or more subframes to be transmitted from the first base station based, at least in part, on the interference information included in the received interference report; and
means for causing the one or more subframes to be transmitted from the first base station based on at least one of the beamforming characteristic or the transmission power setting characteristic.

28. The apparatus of claim 27, comprising the determined beamforming characteristic including a per physical resource block (PRB) precoding matrix indicator (PMI) settings for the one or more subframes to be transmitted from the first base station.

29. The apparatus of claim 27, the means for causing the one or more subframes to be transmitted from the first base station includes means for coordinating one or more beamforming actions between the first base station and the second base station in order to reduce or mitigate the interference associated with downlink transmissions from the first base station.

30. The apparatus of claim 27, comprising means for forwarding the determined beamforming characteristic or the determined transmission power setting characteristic to the second base station via the backhaul communication link to coordinate transmission of the one or more subframes from the first base station with the second base station to mitigate downlink transmission interference associated with the first base station.

31. The apparatus of claim 27, comprising:
- means for periodically receiving subsequent interference reports from the second base station via the backhaul communication link;
- means for determining at least one of an updated beamforming characteristic or an updated transmission power setting characteristic; and
- means for causing the one or more subframes to be transmitted from the first base station based on at least one of the updated beamforming characteristic or the updated transmission power setting characteristic.

32. The apparatus of claim 27, comprising the first base station serving a macrocell and the second base station serving one of a picocell or microcell, the one or more wireless devices physically located within the service area of both the first and second base stations.

\* \* \* \* \*